United States Patent [19]

Hirakata et al.

[11] Patent Number: 4,969,531
[45] Date of Patent: Nov. 13, 1990

[54] CONSTANT VEHICLE SPEED OPERATION CONTROL METHOD AND DEVICE

[75] Inventors: Yoshiaki Hirakata, Tokyo; Morio Sato, Yokohama; Atsuo Oota, Irumagun, all of Japan

[73] Assignee: Honda Giken Kogyo Kabushiki Kaisha, Tokyo, Japan

[21] Appl. No.: 340,806

[22] Filed: Apr. 20, 1989

[30] Foreign Application Priority Data

Apr. 25, 1988 [JP] Japan .................................. 63-111887
May 9, 1988 [JP] Japan .................................. 63-97429

[51] Int. Cl.$^5$ ............................................ B60K 31/04
[52] U.S. Cl. .................................. 180/179; 364/426.04
[58] Field of Search ................ 180/175, 176, 177, 179; 364/426.04

[56] References Cited

FOREIGN PATENT DOCUMENTS 2829894 1/1980 Fed. Rep. of Germany ...... 180/179
8837 1/1987 Japan .................................. 180/175
53122 3/1988 Japan .................................. 180/175

Primary Examiner—Charles A. Marmor
Assistant Examiner—Eric Culbreth

[57] ABSTRACT

An auto cruise control method and device for a vehicle such as a motorcycle allows the vehicle to operate at a constant set speed while avoiding acceleration or deceleration shock after the auto cruise device is temporarily or permanently operated to change the vehicle speed. Therefore, a smoother ride is provided. Also, a final acceleration change rate can be corrected by considerating factors such as slope, wind, load weight, variation in engine output and non-linearity of engine torque characteristics. Moreover, when the speed is to be changed or when operation of the auto cruise device is to be resumed, the speed of the vehicle can be smoothly shifted.

9 Claims, 12 Drawing Sheets

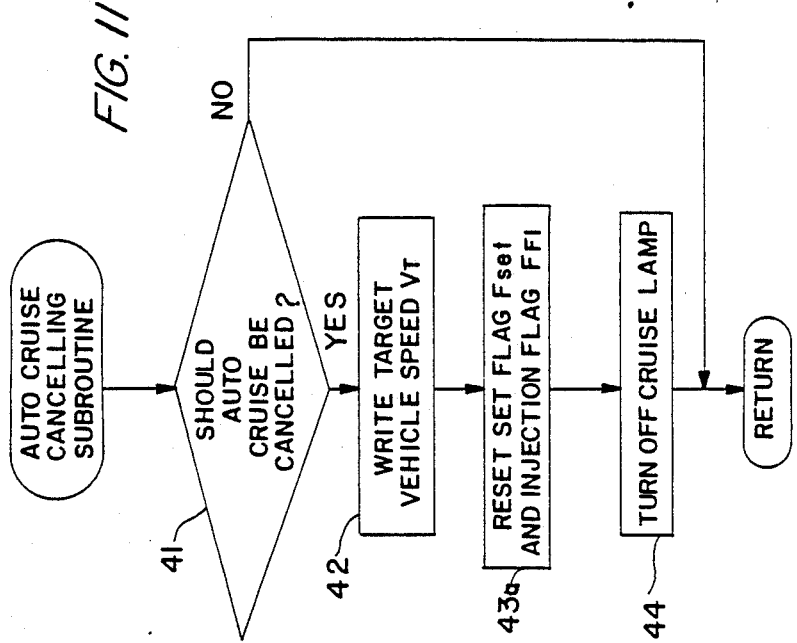
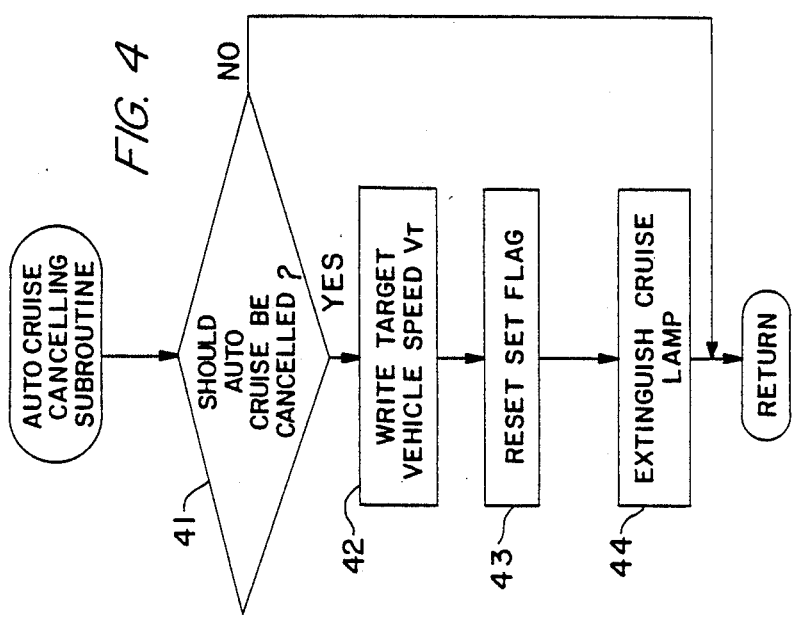

CONSTANT VEHICLE SPEED OPERATION CONTROL METHOD AND DEVICE

BACKGROUND OF THE INVENTION

1. Field of the Invention

The present invention relates to a constant speed control method and device for a vehicle such as a motorcycle.

2. Description of the Background Art

Some vehicles, such as motorcycles are provided with a constant speed control device enabling the vehicle to operate at a constant set speed by automatically controlling an actual vehicle speed for the purpose of reducing fuel consumption, for example, by suppressing fluctuations in vehicle speed during operation on an express highway or the like.

In such a conventional constant vehicle speed control device, the set speed during the auto cruise can be changed by increasing or decreasing a vehicle speed by operation of a switch; however, as the vehicle speed is changed by a predetermined acceleration or deceleration when changing the set vehicle speed, a pleasant acceleration or deceleration feeling is not always felt by a driver or a passenger. Further, in some of the conventional constant vehicle speed operation vehicle devices, after the cruise operation is cancelled, the set vehicle speed just before cancellation of the auto cruise can be resumed by operation of the switch. A constant vehicle speed will then be started again. In this case, it is desired to smoothly resume the set vehicle speed.

Also, in a conventional constant speed control device, an actual vehicle speed is detected, and deviations between the detected actual vehicle speed and a set vehicle speed can be detected. Then, a control quantity is calculated by PD (proportional and differential) control according to the deviation. A throttle valve opening is then controlled according to the control quantity.

However, in a conventional constant vehicle speed control device, an actual acceleration cannot be detected in the constant vehicle speed control. Therefore, there is a possibility that rapid acceleration or deceleration will be generated to again cause an unpleasant feeling to the driver or passenger. Accordingly, a pleasant constant speed feeling cannot always be obtained in such prior art arrangements.

SUMMARY OF THE INVENTION

Accordingly, it is an object of the present invention to provide a constant vehicle speed control device which may provide a pleasant acceleration or deceleration feeling when changing a set vehicle speed and which may also smoothly resume the set vehicle speed.

It is another object of the present invention to provide a constant vehicle speed control method which may obtain a more pleasant constant speed condition.

According to the present invention, there is provided a constant vehicle speed running control device for controlling an output of an engine so as to have an actual vehicle speed of a vehicle to be driven by said engine according to a target vehicle speed. The constant vehicle speed control device comprises commanding means for generating a command signal for commanding a change of said target vehicle speed. This control device also includes a change rate specifying means for specifying an acceleration change rate, a detecting means for detecting an actual acceleration change rate from a vehicle speed change for every unit control cycle and a control means for detecting a deviation between the actual acceleration change rate and the acceleration change rate specified by the change rate specifying means according to the commanding signal for every unit control cycle and for controlling the output of the engine so as to reduce the deviation.

Additionally, the present invention provides a constant vehicle speed control method comprising a first detecting step for detecting an actual vehicle speed of a vehicle to be driven by an engine for every unit control cycle. A second detecting step is then carried out for detecting a vehicle speed deviation between a target vehicle speed and the actual speed for every unit control cycle. Then, a calculating step is carried out for calculating and predicting a next vehicle speed change to be generated in said unit control cycle from a set acceleration change rate. A third detecting step for detects a present vehicle speed change and a fourth detecting step detects a difference between the next vehicle speed change and the present vehicle speed change as a vehicle speed change change rate are then carried out. Next, a comparing step for setting a final acceleration change rate to a small value in consideration of a magnitude of the vehicle speed change rate and then an engine controlling step for acceleratively controlling the engine in the control unit cycle so as to generate a final acceleration change rate.

Additionally, the present invention provides for a constant vehicle speed control method comprising a first detecting step for detecting an actual vehicle speed of a vehicle to be driven by an engine for every unit control cycle. Next, a second detecting step is carried out for detecting a vehicle speed deviation between a target vehicle speed and an actual vehicle speed for every unit control cycle. A first comparing step is performed for comparing a magnitude of the vehicle speed deviation with a limit value and setting a smaller one of the vehicle speed deviation and the limit value to an acceleration change rate. A calculating step for calculating and predicting a next vehicle speed change to be generated in the unit control cycle from the set acceleration change rate is done and a third detecting step for detecting a present vehicle speed change is carried out. Next, a fourth detecting step for detecting a difference between the next vehicle speed change and the present vehicle speed change as a vehicle speed change change rate is done while a second comparing step for comparing a magnitude of the vehicle speed change change rate with the limit value and setting a smaller one of the vehicle speed change rate and the limit value to a final acceleration change rate is performed. Then, an engine controlling step is carried out for acceleratively controlling the engine in the unit control cycle so as to generated the final acceleration change rate.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration, and thus are not limited of the present invention, and wherein:

FIG. 4 is a flow chart explaining operation of the auto cruise cancelling subroutine;

FIG. 11 is a flow chart for explaining operation of the auto cruise cancelling subroutine with reference to the second embodiment;

DETAILED DESCRIPTION OF THE PREFERRED EMBODIMENTS

Figure 1:
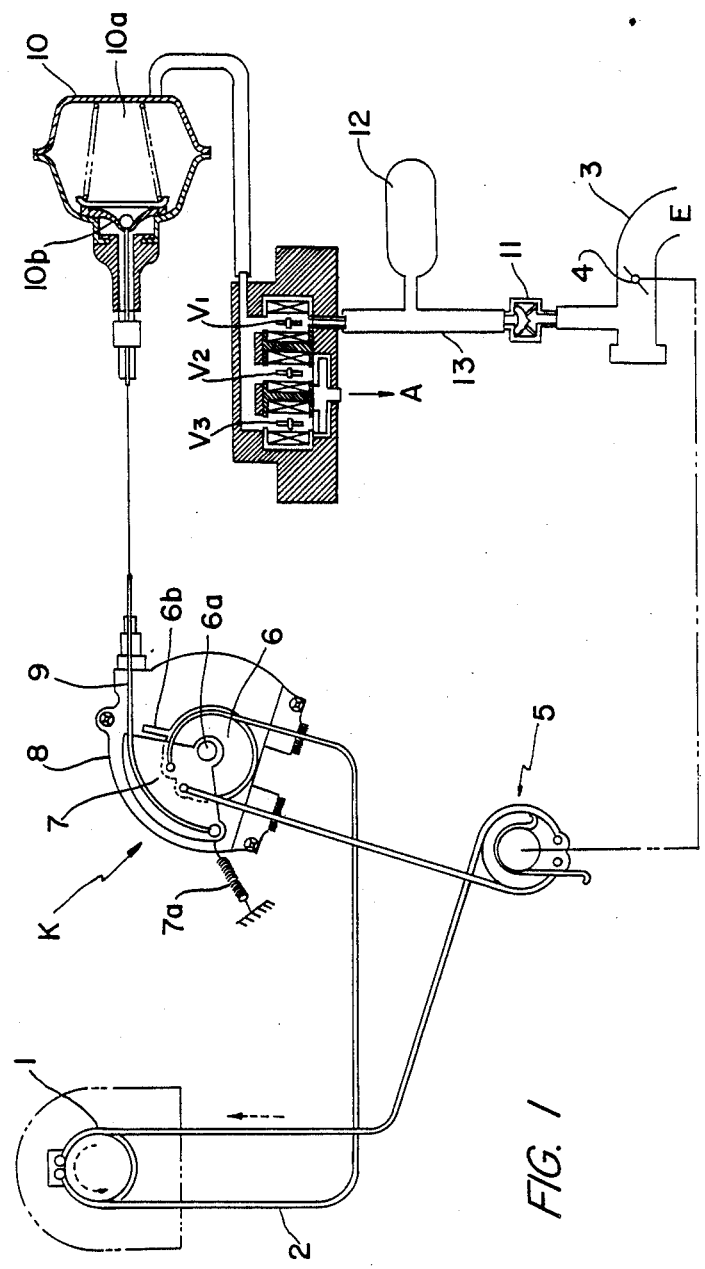
FIG. 1 is a schematic illustration of a constant vehicle speed control device in accordance with the present invention.

Referring in detail to the drawings and with particular reference to FIG. 1, a constant speed control device for vehicles is shown. This device can be used with the method of the instant invention which will now be described. As seen in FIG. 1, a throttle grip 1 is mounted on a steering handle of the vehicle for increasing and decreasing an engine speed. An amount of rotation of the throttle grip 1 is transmitted through a cable 2 to a throttle valve 4 provided in a suction passage 3 of an engine E, so as to change an opening degree of the throttle valve 4.

The cable 2 is wound around a rotative shaft of the throttle grip 1 and extends between a rotative shaft of a valve link 5 for opening and closing the throttle valve 4. The cable 2 is curved and arranged such that a transmitting function can be ensured.

The cable 2 is also connected to a throttle valve opening adjusting mechanism K for controlling the movement of the cable 2 and adjusting the opening degree of the throttle valve 4. The throttle valve opening adjusting mechanism K includes a throttle grip link 6 directly connected to the cable 2 and mounted on a pivotal shaft 6a rotatable in association with the rotation of the throttle grip 1. The throttle valve opening adjusting mechanism K also includes a throttle link 7 rotatably mounted on the pivotal shaft 6a.

The throttle grip link 6 is formed with a stop 6b projecting outwardly from the outer circumference of the throttle grip link 6. The stop 6b is adapted to abut against a side end of the throttle link 7, so as to limit the rotation of the throttle grip link 6 in a counterclockwise direction as viewed in FIG. 1. The throttle link 7 is connected to one end of the cable member 9 which is in turn connected to an actuator 10, so that operation of the actuator 10 is directly transmitted to the throttle link 7. That is, when the cable member 9 is pulled rightwardly as viewed in FIG. 1 by the operation of the actuator 10, the throttle link 7 is rotated in a clockwise direction as viewed in FIG. 1 about the pivotal shaft 6a against a resilient force of a return spring 7a connected to the throttle link 7.

FIG. 1 shows a condition where the throttle link 7 is pulled by the cable member 9 into abutment against the stop 6b of the throttle grip 6. The throttle grip link 6 and the throttle link 7 are housed in a case 8. The cable member 9 may be replaced by another similar transmitting means such as a rod member which is connected to a diaphragm 10b of the actuator 10.

Figures 2, 5:
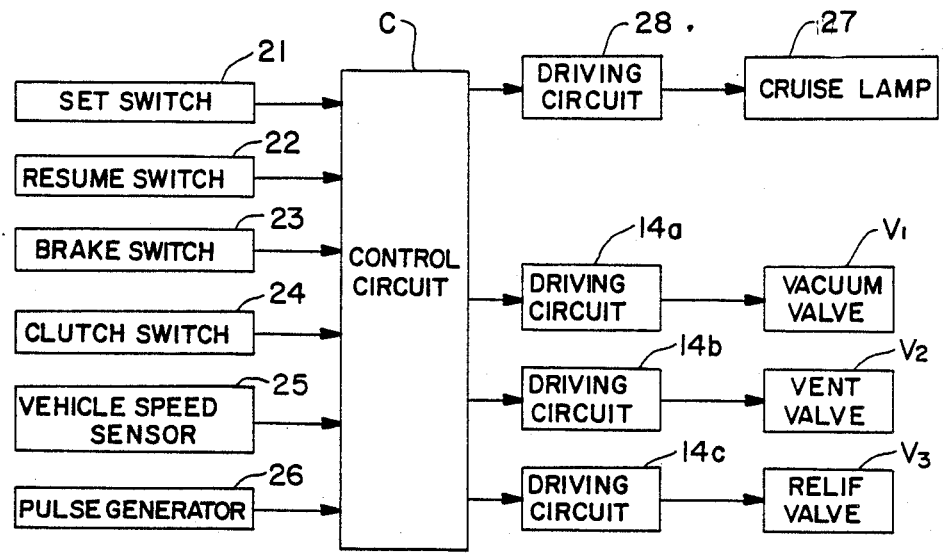
FIG. 2 is a block diagram of an electric circuit for the device shown in FIG. 1.
FIG. 5 is a flow chart explaining operation of the vehicle speed sampling subroutine.

This diaphragm 10b of actuator 10 is connected to the other end of the cable 9 and serves as a driving means for driving the throttle link 7. The diaphragm 10b is expanded and contracted using suction in the suction passage 3 of the engine E. The vacuum is applied at a vacuum chamber 10a of the actuator 10 through a vacuum pipe 13 (provided with a check valve 11 and a surge tank 12) and through a vacuum valve $V_1$. The vacuum is applied during acceleration. A vent valve $V_2$ is provided to induce atmospheric air A during deceleration, and a relief valve $V_3$ is provided to shut off the induction of the atmospheric air A when current is supplied thereto while inducing the atmospheric air A when the supply of current is cut. The valves $V_1$, $V_2$ and $V_3$ are formed from solenoid valves. The operation of these valves is controlled by control signals from a control circuit C through driving circuits 14a to 14c, respectively as seen in FIG. 2.

The control circuit C is constructed of a microcomputer including a microprocessor, clock oscillator, ROM, RAM, I/O interface and I/O port. As shown in FIG. 2, the control circuit C is connected to a set switch 21, resume switch 22, brake switch 23, clutch switch 24 and vehicle speed sensor 25. The set switch 21 is a command switch for commanding constant speed control at a set vehicle speed (which control will hereinafter be referred as to as auto cruise) and also commanding a change in the set vehicle speed to a value lower than the set vehicle speed during auto cruise. The resume switch 22 is a command switch for commanding resumption of the auto cruise speed at the previously set vehicle speed after cancellation of the auto cruise speed and also commanding change of the set vehicle speed to a set value higher than the set vehicle speed during auto cruise. The brake switch 23 is turned on when either a front brake or rear brake of the vehicle is operated, and the clutch switch 24 is turned on when a clutch is operated.

These switches 21 to 24 are adapted to output high level signals to the control circuit C only when they are turned on. The vehicle speed sensor 25 generates a vehicle speed signal of a level corresponding to an actual vehicle speed. A pulse generator 26 is also connected to the control circuit C to generate a pulse signal in synchronism with the rotation of a crankshaft (not shown). The pulse generator 26 supplies this pulse signal to the control circuit C. Further, a cruise lamp 7 for informing a driver of the auto cruise operation is connected through a driving circuit 28 to the control circuit C.

The control circuit C generates a control signal in accordance with a program stored in the ROM. During operation of auto cruise, the control circuit C excites the relief valve V₃ to shut off the induction of atmospheric air A from the relief valve V₃ and also adjusts the degree of opening for the acceleration vacuum valve $V_1$ and the deceleration vent valve $V_2$. The vacuum in the vacuum chamber 10a of the actuator 10 is adjusted by the operation of these valves to expand or contract the diaphragm 10b. Such movement of the diaphram 10b is transmitted through the cable member 9 to the throttle link 7 of the throttle valve opening adjusting mechanism K. An amount of rotation of the throttle link 7 is transmitted through the cable member 2 and the valve link 5 to the throttle valve 4.

The operation of the constant speed running control method according to the present invention will now be described with reference to a flow chart shown in FIGS. 3 to 8. The program shown by the flow chart is executed by the microprocessor in the control circuit C.

When an ignition switch (not shown) is turned on, the microprocessor starts the processing of a main routine. First, the values of variants, flags and the like are initialized (step 31). Then, an auto cruise cancelling subroutine (step 32) and a vehicle speed sampling subroutine (step 33) are executed. After execution of the vehicle speed sampling subroutine, it is determined from the content of a set flag $F_{set}$ whether or not the vehicle is in an auto cruise (step 34). If $F_{set}=1$, it is indicated that the vehicle is in auto cruise, and accordingly an auto cruise controlling subroutine is executed (step 35). If $F_{set}=0$, it is indicated that the vehicle is not in auto cruise, and accordingly a set resume subroutine is executed (step 36). After execution of the step 35 or 36, the steps 32 and the subsequent steps are repeatedly executed for every unit control cycle.

The auto cruise cancelling subroutine is shown in FIG. 4. First, it is determined whether the vehicle running condition is such that the auto cruise should be cancelled (step 41). For example, when the brake switch 23 or the clutch switch 24 is on, or when a vehicle speed V is not greater than a predetermined value, or when an engine speed is not less than a predetermined value, it is determined that the auto cruise should be cancelled, and a target vehicle speed $V_T$ as a set vehicle speed is written at a predetermined location in the RAM (step 42). Then, the set flag $F_{set}$ is reset (step 43), and the cruise lamp 27 is turned off to cancel the auto cruise (step 44). On the other hand, if it is determined that the auto cruise should not be cancelled, the auto cruise cancelling subroutine is immediately ended so as to continue auto cruise operation.

FIG. 5 shows the vehicle speed sampling subroutine. First, a present vehicle speed V(n) is substituted for a previous vehicle speed V(n−1) (step 51), and an actual vehicle speed V is newly read (step 52). Then, the actual vehicle speed V is substituted for the present vehicle speed V(n) (step 53). Further, a present vehicle speed change $\alpha(n)$ is substituted for a previous vehicle speed change $\alpha(n-1)$ (step 54), and a value obtained by subtracting the previous vehicle speed V(n−1) from the present vehicle speed V(n) is substituted for the present vehicle speed change $\alpha(n)$ (step 55).

Figure 6:
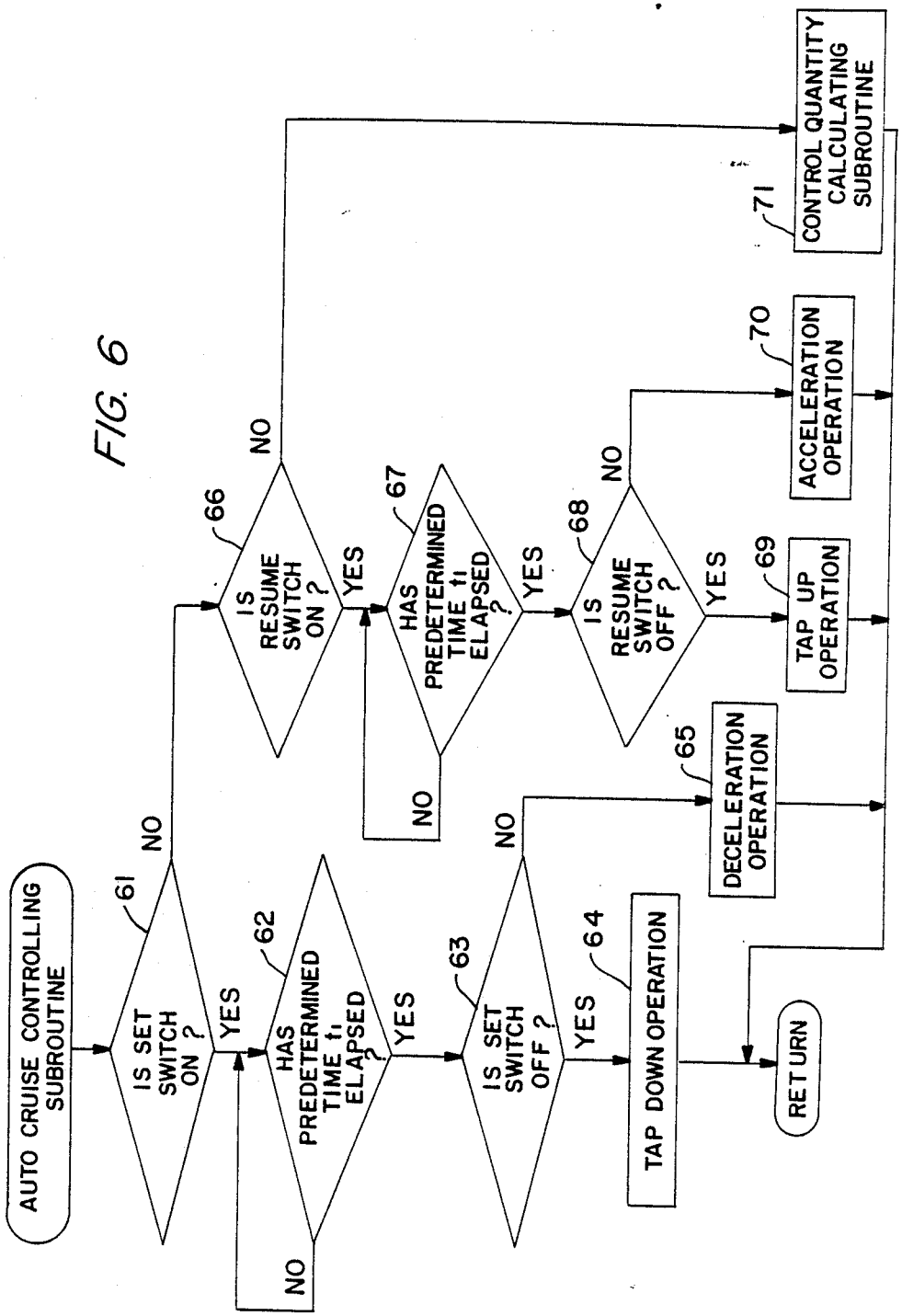
FIG. 6 is a flow chart explaining operation of the auto cruise controlling subroutine.

FIG. 6 shows the auto cruise controlling subroutine. First, it is determined whether the set switch 21 is on (step 61). If the set switch 21 is on, it is determined whether a predetermined time $t_1$ or more has elapsed after determination of the on-state of the set switch 21 (step 62). If the predetermined time $t_1$ or more has elapsed, it is determined whether the set switch 21 is off (step 63). If the set switch 21 is off, it is determined that the set switch 21 has been operated instantaneously, and accordingly the target vehicle speed $V_T$ is reduced by a predetermined vehicle speed $V_A$ (0.5 km/h, for example). This operation is called a TAP DOWN operation (step 64). In step 63, if the set switch 21 is on, it is determined that the operation of the set switch 21 is continued, and accordingly the target vehicle speed $V_T$ is reduced by a predetermined vehicle speed $V_B$ (1.0 km/h, for example) for every unit control cycle. This operation is called a deceleration operation (step 54).

On the other hand, in step 61, if the set switch 21 is off, it is determined whether the resume switch 22 is on (step 66). If the resume switch 22 is on, it is determined whether the predetermined time $t_1$ or more has elapsed after determination of the on-state of the resume switch 22 (step 67). If the predetermined time $t_1$ has elapsed, it is determined whether the resume switch 22 is off (step 68). If the resume switch 22 is off, it is determined that the resume switch 22 has been operated instantaneously, and accordingly the target vehicle speed $V_T$ is increased by the predetermined vehicle speed (0.5 km/h, for example). This operation is called a TAP UP operation (step 69). In step 68, if the resume switch 22 is on, it is determined that the operation of the resume switch 22 is continued, and accordingly the target vehicle speed $V_T$ is increased by the predetermined vehicle speed $V_B$ (1.0 km/h, for example) for every unit control cycle. This operation is called an acceleration operation (step 70). On the other hand, in step 66, if the resume switch 22 is off, it is determined that both the set switch 21 and the resume switch 22 are in the off-state. In this case, a control quantity calculating subroutine to be hereinafter described is executed (step 71).

Figure 7:
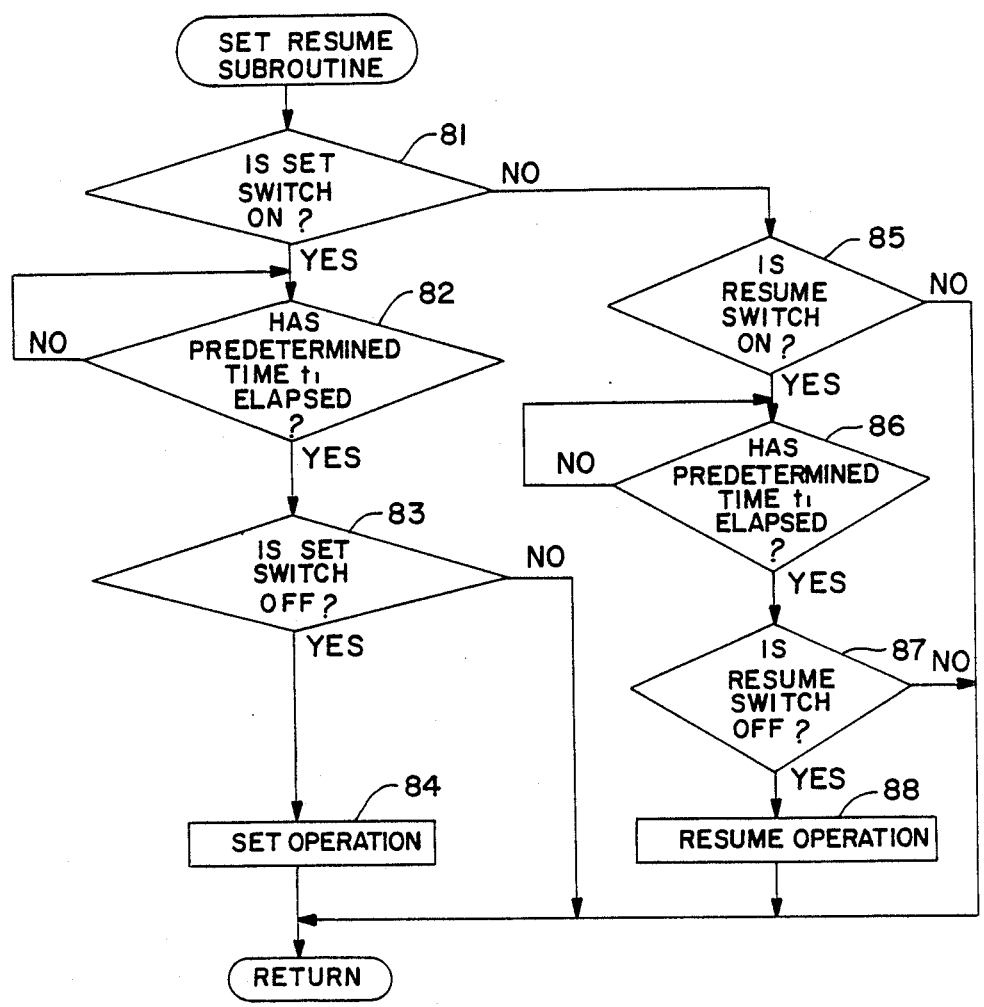
FIG. 7 is a flow chart explaining operation of the set resume subroutine.

FIG. 7 shows the set resume subroutine. First, it is determined whether the set switch 21 is on (step 81). If the set switch 21 is on, it is determined whether the predetermined time $t_1$ or more has elapsed after determination of the on-state of the set switch 21 (step 82). If the predetermined time $t_1$ or more has elapsed, it is determined whether the set switch 21 is off (step 83). If the set switch 21 is off, it is determined that the set switch 21 has been operated instantaneously, and accordingly a set operation is executed (step 84). In the set operation, the actual vehicle speed V at the time when the set switch 21 is turned off is stored as the target vehicle speed $V_T$ for auto cruise operation at a predetermined location in the RAM in the control circuit C. At the same time, the cruise lamp 27 is turned on so as to indicate that the auto cruise control is effective, and the set flag $F_{set}$ is set. Thus, the auto cruise operation is started.

In step 81, if the set switch 21 is off, it is determined whether the resume switch 22 is on (step 85). If the resume switch 22 is on, it is determined whether the predetermined time $t_1$ or more has elapsed after determination of the on-state of the resume switch 22 (step 86). If the predetermined time $t_1$ or more has Z5 elapsed, it is determined whether the resume switch 22 is off (step 87). If the resume switch 22 is off, it is determined that the resume switch 22 has been operated instantaneously, and accordingly a resume operation is executed (step 88). In the resume operation, the cruise lamp 27 is turned on, and the set flag $F_{set}$ is set. Thus, the auto cruise operation is started at the target vehicle speed $V_T$ in the previous auto cruise operation stored at the predetermined location in the control circuit C.

Figure 8:
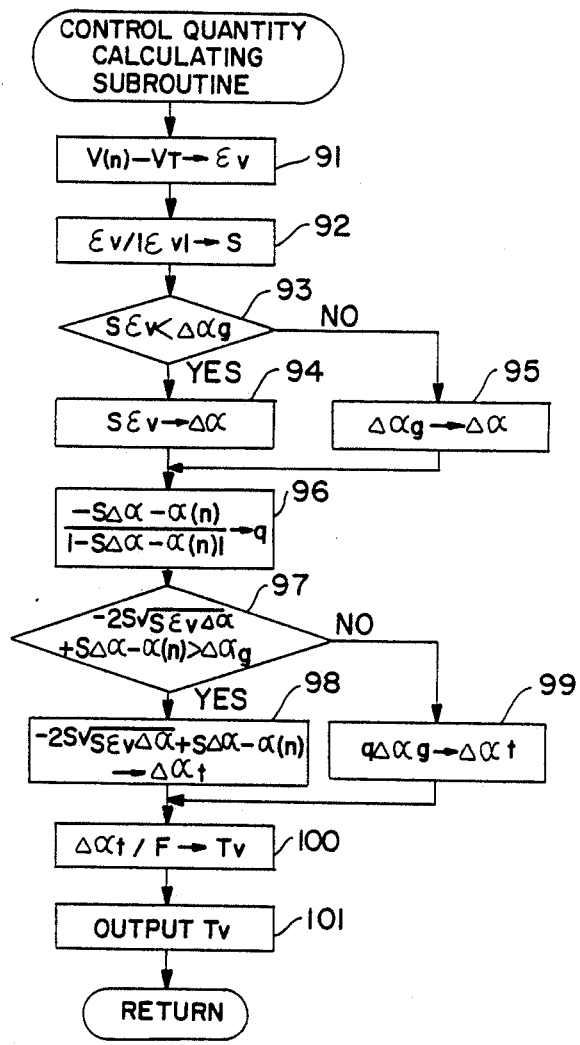
FIG. 8 is a flow chart explaining operation of the control quantity calculating subroutine.

FIG. 8 shows the control quantity calculating subroutine. First, a vehicle speed deviation $\epsilon v$ between the present vehicle speed V(n) and the target vehicle speed $V_T$ is calculated (step 91), and a sign s of the vehicle speed deviation $\epsilon v$ ($s=\epsilon v/|\epsilon v|$) is calculated (step 92). Then it is determined whether an absolute value $s\epsilon v$ of the vehicle speed deviation $\epsilon v$ is smaller than a limit value $\Delta \alpha g$ ($>0$) (step 93). If $s\epsilon v > \Delta \alpha g$, $s\epsilon v$ is set to an acceleration change rate $\Delta \alpha$ (step 94). If $s\epsilon v \geq \Delta \alpha g$, the limit value $\Delta \alpha g$ is set to the acceleration change rate $\Delta \alpha$ (step 95).

In the case when the vehicle speed deviation $ev$ from the target vehicle speed $V_T$ is generated, and the vehicle speed is intended to reach the target vehicle speed $V_T$ after a time t has elapsed, the following equations hold wherein $\alpha(t)$ and $\epsilon(t)$ denote an acceleration and a vehicle speed deviation after the time t is elapsed, respectively.

$$\begin{aligned} \alpha(t) &= \alpha_0 + \int s\Delta\alpha dt \\ &= \alpha_0 + s\Delta\alpha t \\ &= 0 \end{aligned} \qquad (1)$$

$$\begin{aligned} \epsilon(t) &= \epsilon v + \int \alpha(t) dt \\ &= \epsilon v + \alpha_0 t + (\tfrac{1}{2}) s\Delta\alpha t^2 \\ &= 0 \end{aligned} \qquad (2)$$

Where, $\alpha_0$ denotes an acceleration at the timing of generation of the vehicle speed deviation $\epsilon_v$. This acceleration is obtained from equation (1) as follows:

$$\alpha_0 = -s\Delta\alpha t \qquad (3)$$

Further, the acceleration change rate $\Delta \alpha$ is obtained from Equations (2) and (3) as follows:

$$\Delta\alpha = (2s\ \epsilon v)/t^2 \qquad (4)$$

Assuming that the unit control cycle for the auto cruise is a one control cycle, the acceleration change rate $\Delta \alpha$ required for having the vehicle speed reach the target vehicle speed $V_T$ after the unit control cycle has elapsed can be obtained by substituting $t=1$ in Equation (4) as follows:

$$\Delta\alpha = 2s\epsilon v \qquad (5)$$

It is determined whether the acceleration change rate $2s\epsilon v$ is smaller than the limit value $\Delta \alpha g$, and a smaller one is set to the acceleration change rate $\Delta \alpha$. In step 93, the limit value and the acceleration change rate are set as $\Delta \alpha g/2$ and $\Delta \alpha/2$ ($=s\epsilon v$), respectively.

In controlling the vehicle speed by using the acceleration change rate $\Delta \alpha$ as set above, a next vehicle speed change ALPHA to be generated in the next unit control cycle is obtained from Equations (2) to (4) as follows:

$$\begin{aligned} \text{ALPHA} &= \epsilon(1) - \epsilon(0) \\ &= \alpha_0 + s(\Delta\alpha/2) \\ &= -s\sqrt{2s\epsilon v\Delta\alpha} + s(\Delta\alpha/2) \end{aligned} \qquad (6)$$

If the vehicle speed change ALPHA is constant in the next unit control cycle, the vehicle speed reaches the target vehicle speed $V_T$. The difference $\Delta \alpha t(n)$ (vehicle speed change change rate) between the next vehicle speed change ALPHA and the present vehicle speed change $\alpha(n)$ is obtained from Equation (6) as follows:

$$\begin{aligned} \Delta\alpha t(n) &= \text{ALPHA} - \alpha(n) \\ &= -s\sqrt{2s\epsilon v\Delta\alpha} + s(\Delta\alpha/2) - \alpha(n) \end{aligned} \qquad (7)$$

In Equation, $2\Delta \alpha g$ is substituted for $\Delta \alpha g$ to obtain the following equation.

$$\Delta\alpha t(n) = -2s\sqrt{s\epsilon v\Delta\alpha} + s\Delta\alpha - \alpha(n) \qquad (8)$$

In Equation, $\epsilon v = \Delta \alpha/s$ is substituted to obtain the following equation.

$$\Delta\alpha t(n) = -s\Delta\alpha - \alpha(n) \qquad (9)$$

Therefore, the microprocessor calculates a sign q of the difference $\Delta \alpha t(n)$ in accordance with the following equation after execution of the step 94 or 95 (step 96).

$$q = \{-s\Delta\alpha - \alpha(n)\}/|-s\Delta\alpha - \alpha(n)| \qquad (10)$$

Then, it is determined whether the difference $\Delta\alpha t(n) = -2s\sqrt{s\epsilon v\Delta\alpha} + s\Delta\alpha - \alpha(n)$ is smaller than the limit value $\Delta \alpha g$ (step 97). If $\Delta \alpha t(n) < \Delta \alpha g$, $-2s\sqrt{s\epsilon v\Delta\alpha} + s\Delta\alpha - \alpha(n)$ is set to a final acceleration change rate $\Delta \alpha t$ (step 98). If $\Delta \alpha t(n) \geq \Delta \alpha g$, $q\Delta \alpha g$ is to set to the final acceleration change rate $\Delta \alpha t$ (step 99). Then, the final acceleration change rate $\Delta \alpha t$ is divided by a constant F, and the divided value is set to a control time $T_V$ for the acceleration vacuum value $V_1$ or the deceleration vent valve $V_2$ for every unit control cycle (step 100). The control time $T_V$ is output to the driving circuit 14a or 14b (step 101). If the control time $T_V$ is positive, the driving circuit 14a operates to open the valve $V_1$ by the control time $T_V$. If the control time $T_V$ is negative, the driving circuit 14b operates to open the valve $V_2$ by the control time $|T_V|$. Accordingly, the vacuum in the vacuum chamber 10a is changed to control the opening degree of the throttle valve 4.

In the case of considering a change in acceleration due to an external force to be applied to the vehicle, the constant speed control is effected as will be explained below:

Assuming that the external force to be applied to the vehicle includes a rolling resistance $r_{rol}$, air resistance $r_{air}$ and slope $r_{slp}$, an acceleration a to be applied to the vehicle is expressed as follows:

$$a = (t_0 + r_{rol} + r_{air} + r_{slp})/w \qquad (11)$$

where, $t_0$ stands for an engine generating torque and w stands for a vehicle weight. In Equation (11), $r = r_{rol} + r_{air} + r_{slp}$ is substituted to obtain the following equation.

$$a = (t_0 + r)/w \qquad (12)$$

If the running resistance and the vehicle weight are changed to generated $\Delta r$ and $\Delta w$, an acceleration change rate to be generated by a torque $\Delta t$ can be expressed as follows:

$$\Delta a = (\Delta t + \Delta r)/(w + \Delta w) \qquad (13)$$

Assuming that the vehicle is driven on a flat road with a single person, and that a torque change $\Delta T$ is necessary for obtaining an acceleration change $\Delta A$, a deviation $\epsilon\alpha$ between a target acceleration change rate $\Delta\alpha t$ and an acceleration change rate $\Delta\alpha$ is expressed as follows:

$$\begin{aligned}\epsilon\alpha &= \Delta\alpha t - \Delta\alpha \\ &= \Delta\alpha t - (\Delta t + \Delta r)/(w + \Delta w) \\ &= \Delta\alpha t - \{\Delta t/(w + \Delta w) + \Delta r/(w + \Delta w)\} \\ &= \Delta\alpha t - \{(\Delta t/w)/(1 + \Delta w/w) + \Delta r/(w + \Delta w)\} \\ &= \Delta\alpha t - \{(\Delta A/\Delta T)\Delta t/(1 + \Delta w/w) + \Delta r/(w + \Delta w)\}\end{aligned} \quad (14)$$

Letting F, h and $\Delta\alpha r$ denote an acceleration/torque ratio, weight change ratio and acceleration change rate due to a change in external force, respectively, F, h and $\Delta\alpha r$ can be expressed as follows:

$$F = \Delta A/\Delta T \quad (15)$$

$$h = 1 + \Delta w/w \quad (16)$$

$$\Delta\alpha r = \Delta r/(w + \Delta w) \quad (17)$$

Substituting Equations (15), (16) and (17) into Equation (14), the deviation $\epsilon\alpha$ can be expressed as follows:

$$\epsilon\alpha = \Delta\alpha t - (F\Delta t/h + \Delta\alpha r) \quad (18)$$

Substituting a previous final acceleration change rate $\Delta\alpha t(n-1)$, a previous acceleration rate $\Delta\alpha r(n-1)$, a previous torque $\Delta t(n-1)$ and a present deviation $\epsilon\alpha(n)$ into Equation (18), the weight change ratio h ($1 \leq h \geq 2$) can be obtained as follows:

$$h = F\Delta t(n-1)/\{\Delta\alpha t(n-1) - \epsilon\alpha(n) - \Delta\alpha r(n-1)\} \quad (19)$$

An average h(n) of the present weight change ratio h (h(0)=1) is obtained as follows:

$$h(n) = (1/n) \sum_{n=1}^{n} h \quad (20)$$

Accordingly, a present acceleration change rate $\Delta\alpha r(n)$ can be predicted from these values and expressed as follows:

$$\Delta\alpha r(n) = \Delta\alpha t(n-1) - \epsilon\alpha(n) - F\Delta t(n-1)/h(n) \quad (21)$$

where, $$\Delta\alpha r(0) = 0.$$

Then, a control quantity as a present torque $\Delta t(n)$ is obtained from the predicted value $\Delta\alpha r(n)$ and $\epsilon\alpha(n+1)=0$ as follows:

$$\Delta t(n) = (h(n)/F)\{\Delta\alpha t(n) - \Delta\alpha r(n)\} \quad (22)$$

Figure 9:
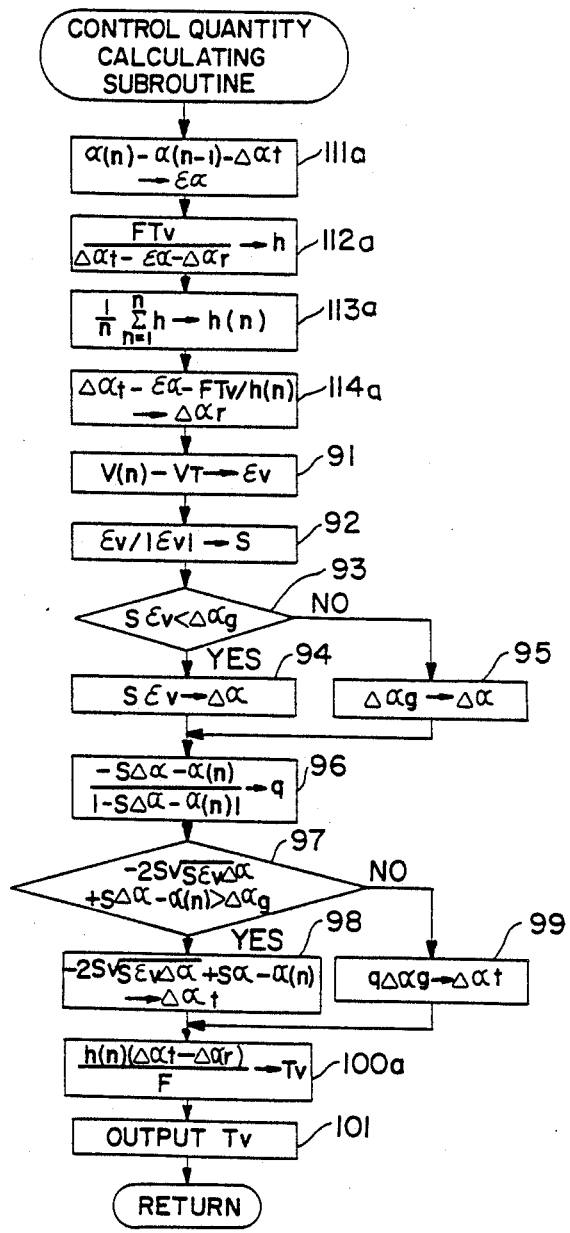
FIG. 9 is a flow chart explaining operation of the control quantity calculating subroutine.

Assuming that the torque is proportional to a throttle opening, that is, the control time $T_V$, $\Delta t = T_V$ can be substituted. Therefore, the constant speed control can be effected considering a change in acceleration due to an external force to be applied to the vehicle. FIG. 9 shows a control quantity calculating subroutine in this case.

In the control quantity calculating subroutine, an acceleration change is controlled by a final acceleration change rate $\Delta\alpha t$ set before a unit control cycle, and a deviation $\epsilon\alpha$ of the acceleration change in the unit control cycle where a present vehicle speed change $\alpha(n-1)$ reaches a present vehicle speed change $\alpha(n)$ is calculated (step 111a). The deviation $\epsilon\alpha$ is calculated in accordance with the following equation.

$$\epsilon\alpha = \alpha(n) - \alpha(n-1) - \Delta\alpha t \quad (23)$$

Then, a vehicle weight change ratio h is calculated from the deviation $\epsilon\alpha$, constant F, control time $T_V$, final acceleration change rate $\Delta\alpha t$ and acceleration change rate $\Delta\alpha r$ due to disturbance in accordance with the following equation similar to Equation (19) (step 112a).

$$h = FT_V/(\Delta\alpha t - \epsilon\alpha - \Delta\alpha r) \quad (24)$$

After calculation of the vehicle weight change ratio h, an average of the vehicle weight change ratio h is calculated as follows (step 113a):

$$h(n) = (1/n) \sum_{n=1}^{n} h \quad (25)$$

Then, the present acceleration change rate $\Delta\alpha r$ is calculated in accordance with the following equation similar to Equation (21) (step 114a).

$$\Delta\alpha r = \Delta\alpha t - \epsilon\alpha - FT_V/h(n) \quad (26)$$

After execution of the step 114a, the program proceeds to step 91 in the same manner as the subroutine shown in FIG. 8. Then, after execution of the step 98 or 99, the control time $T_V$ is calculated in accordance with the following equation (step 100a).

$$T_V = (h(n)/F)(\Delta\alpha t - \Delta\alpha r) \quad (27)$$

Figure 10:
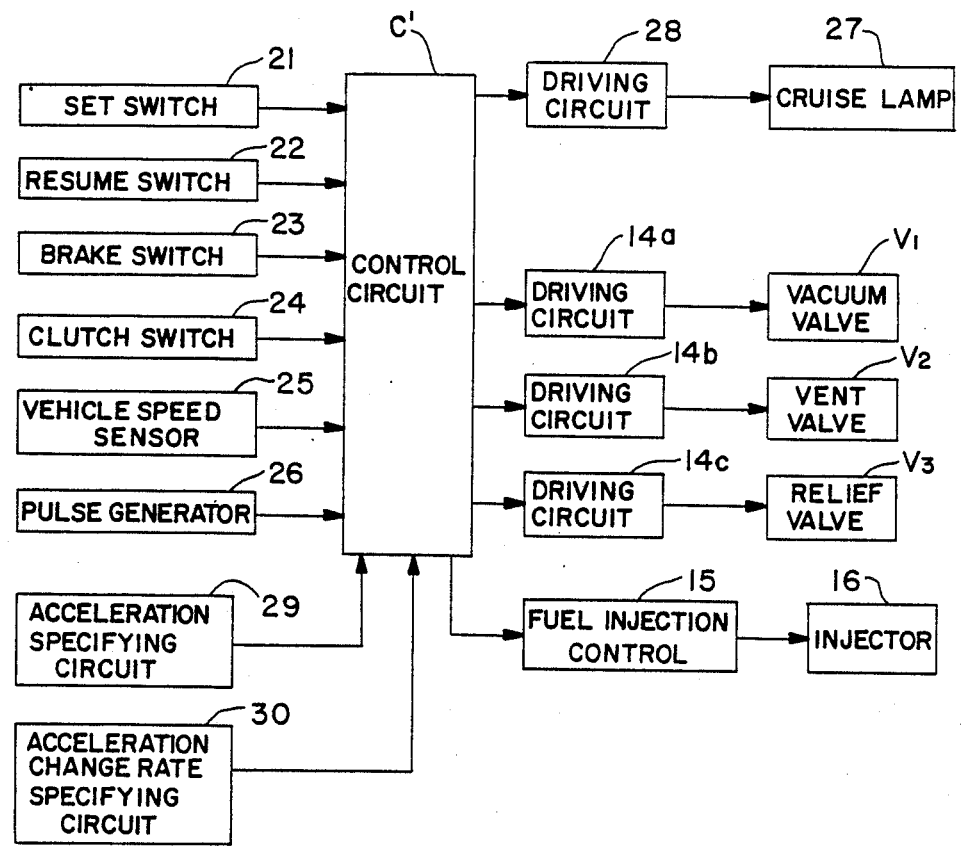
FIG. 10 is a block diagram of an electric circuit for a second embodiment of the present invention.

A slightly modified control circuit C' is further shown in FIG. 10. This control circuit C' is similar to that shown in FIG. 2 but also includes an acceleration specifying circuit 29 for specifying an acceleration $|\alpha_s|$ just after changing a set vehicle speed during the auto cruise operation and an acceleration change rate specifying circuit 30 for specifying an acceleration change rate $|\Delta\alpha_s|$. The acceleration specifying circuit 29 and the acceleration change rate specifying circuit 30 include variable resistors (not shown), respectively. A predetermined voltage is applied across fixed terminals of each variable resistor. A movable element of each variable resistor is moved in associated with the operation of an operating knob (not shown) to change a voltage output from the movable element. The voltage signals from the variable resistors are supplied as the acceleration $|\alpha_s|$ and the acceleration change rate $|\Delta\alpha_s|$ indicative of the signals to the control circuit C'. The operating knobs for operating the variable resistors of the acceleration specifying circuit 29 and the acceleration change rate specifying circuit are provided on an instrument panel at a drivers seat, for example.

The control circuit C' is adapted to generate a control signal in accordance with a program stored in the ROM. In the auto cruise operation, the control circuit C' calculates a control time $T_V$ for every unit control cycle. If the control time $T_V$ is positive, it is supplied to the driving circuit 14a; however, if the control time $T_V$ is negative, it is supplied to the driving circuit 14b. The driving circuit 14a drives the acceleration vacuum valve $V_1$ by the control time $T_V$ to supply a vacuum into the vacuum chamber 10a, and the driving circuit 14b drives the deceleration vent valve $V_2$ by the control time $|T_V|$ to supply atmospheric air into the vacuum chamber 10a. The vacuum in the vacuum chamber 10a of the actuator 10 is adjusted by the operation of these valves to expand or contract the diaphragm 10b similar to the arrangements set forth for control circuit C in FIG. 2.

In particular, movement of the diaphragm 10b is transmitted through cable 9 to the throttle link 7 of the throttle valve opening adjusting mechanism K. An amount of rotation of the throttle link 7 is transmitted through the cable member 2 and the valve link 5 to the throttle valve 4. That is, the more the vacuum in the vacuum chamber 10a, the more the throttle valve 4 opens.

Figure 3:
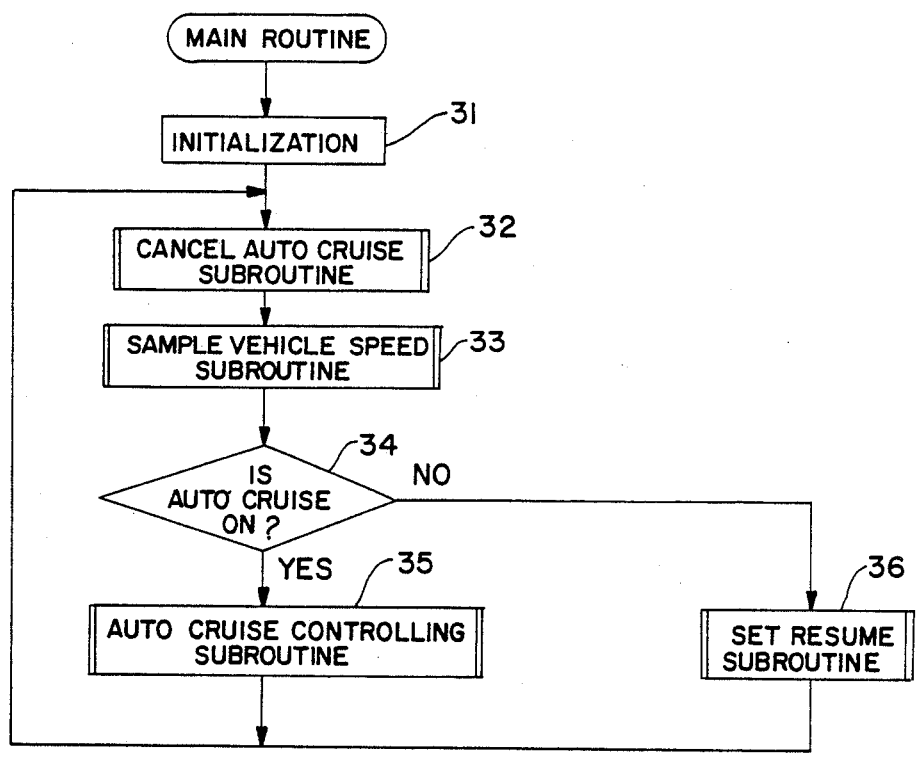
FIG. 3 is a flow chart explaining operation of the main routine.

The operation of a constant speed running control method according to the control circuit C' of the present invention will now be described. The main routine program shown by the flow chart of FIG. 3 is also executed by the microprocessor in the control circuit C'. The steps thereof will not now be reiterated.

The auto cruise cancelling subroutine for the control circuit C' is similar to that shown in FIG. 4 but will now be described with reference to FIG. 11 for control circuit C'. First, it is determined whether the vehicle operation condition is one where the auto cruise should be cancelled (step 41). That is, when the brake switch 23 or the clutch switch 24 is on, or a vehicle speed V is not greater than a predetermined value, or an engine speed is not less than a predetermined value, it is determined that the auto cruise should be cancelled, and a target vehicle speed $V_T$ as a set vehicle speed is written at a predetermined location in the RAM (step 42). The operation for auto cruise cancelling subroutine for the control circuit C' now differs from that for the control circuit C because the set flag $F_{set}$ and an injection flag $F_{FI}$ are reset (step 43a) in control circuit C'. The cruise lamp 27 will then be turned off to cancel the auto cruise operation (step 44). On the other hand, if it is determined that the auto cruise should not be cancelled, the auto cruise cancelling subroutine is immediately ended so as to continue the auto cruise operation.

The vehicle speed sampling subroutine and the cruise controlling subroutine for control circuit C' are shown in FIGS. 5 and 6, respectively. Because these subroutines for control circuit C' are similar to those for control circuit C, the steps thereof are not now reiterated.

Figure 12:
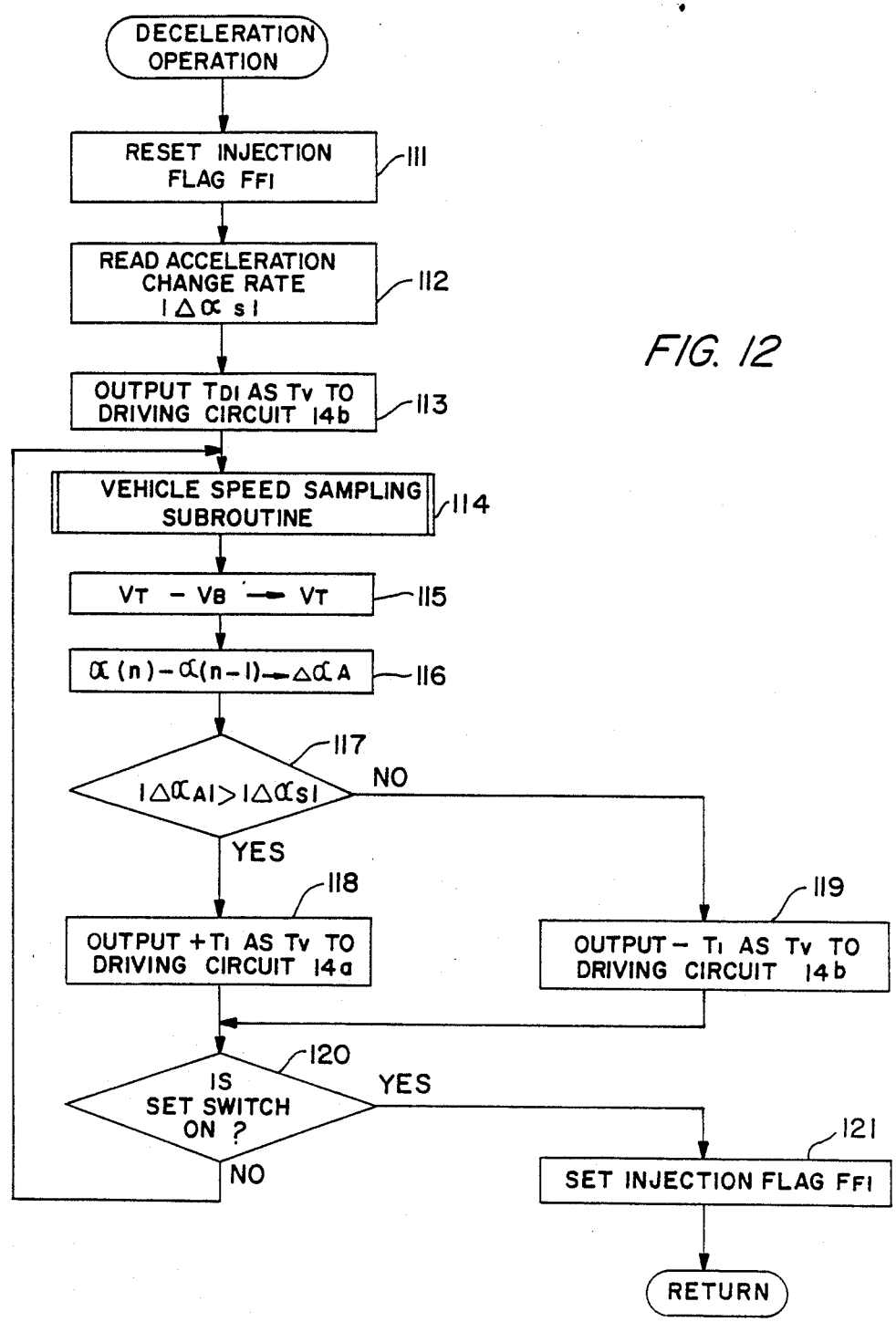
FIG. 12 is a flow chart explaining operation of the deceleration operation.

Referring now to FIG. 12, the deceleration operation will be explained. This operation is initiated as step 65 in the auto cruise controlling subroutine shown in FIG. 6. First, the injection flag $F_{FI}$ is reset (step 111), and the acceleration change rate $|\Delta\epsilon_s|$ as the output signal from the acceleration change rate specifying circuit 30 is read (step 112). Then, a predetermined time $T_{D1}$ (<0) as the control time $T_V$ is output to the driving circuit 14b so as to start deceleration (step 113). Then, the vehicle speed sampling subroutine is executed after the unit control cycle has elapsed (step 114). The predetermined vehicle speed is subtracted from the target vehicle speed $V_B$ 115), and a difference $\Delta\alpha_A$ between the present vehicle speed $\alpha(n)$ and the present vehicle speed change $\alpha(n-1)$ is calculated (step 116). Then, it is determined whether an absolute value $|\Delta\alpha_A|$ of the difference $\Delta\alpha_A$ is greater than the acceleration change rate $|\Delta\alpha_s|$ (step 117). If $|\Delta\alpha_A| > |\Delta\alpha_s|$, a predetermined time $T_1$ (>0) as the control time $T_V$ is output to the driving circuit 14a (step 118), while if $|\Delta\alpha_A| \leq |\Delta\alpha_s|$, a predetermined time $-T_1$ as the control time $T_V$ is output to the driving circuit 14b (step 119). Then, it is determined whether the set switch 21 is off (step 120). If the set switch 21 is on, the program is returned to step 114 after the unit control cycle has elapsed, and the vehicle speed sampling subroutine is executed. If the set switch 21 is off, the injection flag $F_{FI}$ is set (step 121), and the deceleration operation is ended.

Figure 13:
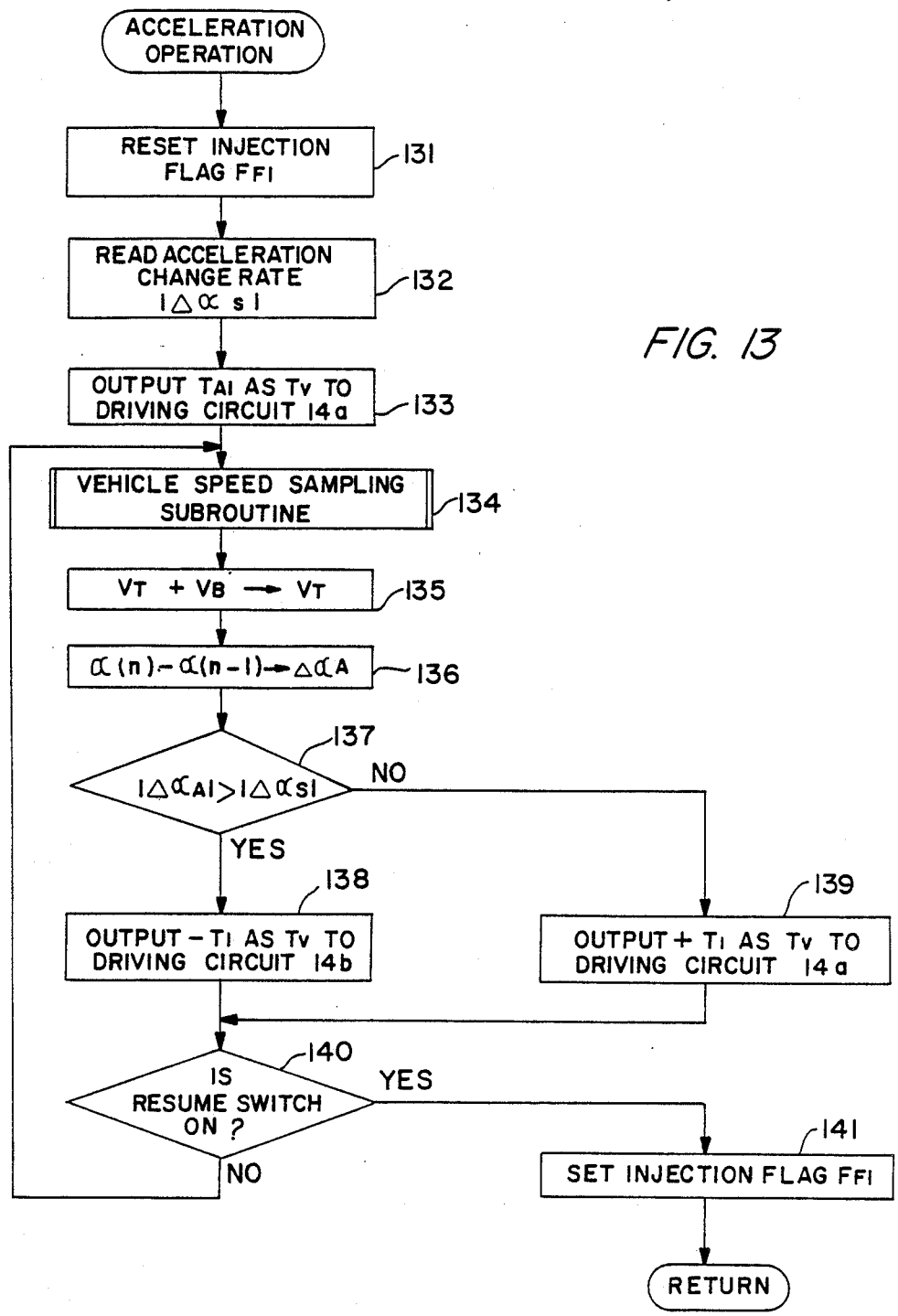
FIG. 13 is a flow chart explaining operation of the acceleration operation.

On the other hand, if step 70 in the auto cruise controlling subroutine shown in FIG. 6 is actuated, then the acceleration operation for control circuit C' will be operated as shown in FIG. 13. In particular, flag $F_{FI}$ is reset (step 131), and the acceleration change rate $|\Delta\alpha_s|$ as the output signal from the acceleration change rate specifying circuit 30 is read (step 132). Then, a predetermined time $T_{A1}$ (>0) as the control time $T_V$ is output to the driving circuit 14a so as to start acceleration (step 133). Then, the vehicle speed sampling subroutine is executed after the unit control cycle has elapsed (step 134). The predetermined vehicle speed $V_B$ is added to the target vehicle speed $V_T$ (step 135), and the difference $\Delta\alpha_A$ between the present vehicle speed change $\alpha(n)$ and the present vehicle speed change $\alpha(n)$ is calculated (step 136). Then, it is determined whether an absolute value of the $|\Delta\alpha_A|$ of the difference $\Delta\alpha_A$ is greater than the acceleration change rate $|\Delta\alpha_s|$ (step 137). If $|\Delta\alpha_a| 22 |\Delta\alpha_s|$, a predetermined time $-T_1$ (>0) as the control time $T_V$ is output to the driving circuit 14b (step 138), while if $|\Delta\alpha_A| \leq |\Delta\alpha_S|$, a predetermined time $T_1$ as the control time $T_V$ is output to the driving circuit 14a (step 139). Then, it is determined whether the resume switch 22 is off (step 140). If the resume switch 22 is on, the program is returned to the step 134 after the unit control cycle has elapsed, and the vehicle speed sampling subroutine is executed. If the resume switch 22 is off, the injection flag $F_{FI}$ is set (step 141), and the acceleration operation is ended.

The set resume subroutine for control circuit C' is similar to that shown in FIG. 7; however, in the set operation (step 84) both the set flag $F_{set}$ and injection flag $F_{FI}$ are set. Otherwise, the set operation (step 84) is the same. The actual vehicle speed V at the timing when the set switch 21 is turned off is stored as the target vehicle speed $V_T$ for the auto cruise operation at a predetermined location in the RAM in the control circuit C'. At the same time, the cruise lamp 27 is turned on so as to indicate that the auto cruise control is effective and the auto cruise operation has started.

Figure 14:
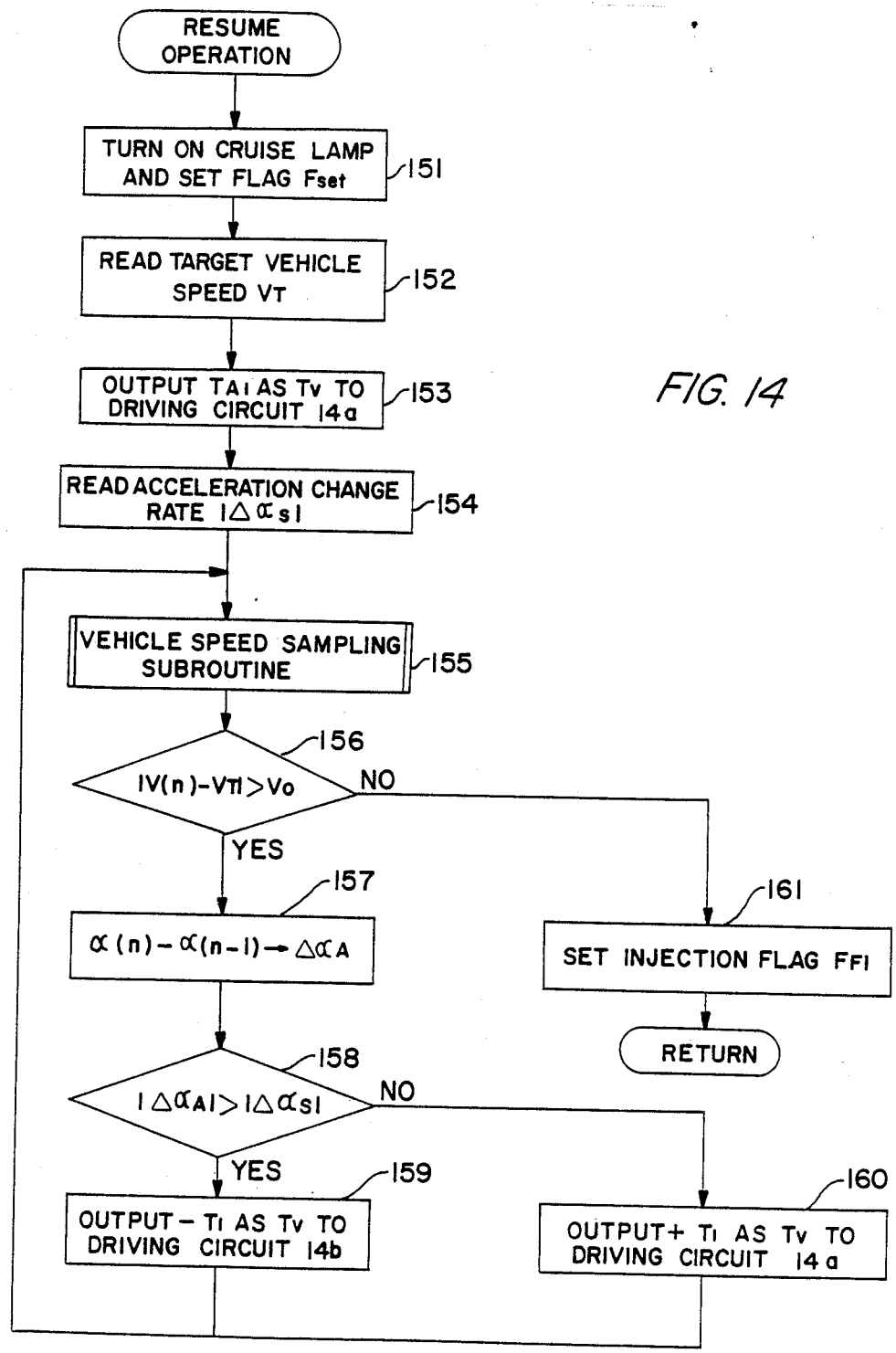
FIG. 14 is a flow chart explaining operation of the resume operation.

Referring to FIG. 14, the resume operation will now be described. The cruise lamp 27 is turned on and the set flag $F_{set}$ is set (step 151). Then, the target vehicle speed $V_T$ in the previous auto cruise operation is stored at a predetermined location in the RAM and the control circuit C' is read (step 152). Then, the predetermined time $T_{A1}$ as the control time $T_V$ is output to the driving circuit 14a so as to start acceleration (step 153), and the acceleration change rate $|\Delta\alpha_s|$ as the output signal from the acceleration change rate specifying circuit 30 is read (step 154). Then, the vehicle speed sampling subroutine is executed after the unit control cycle has elapsed (step 155). Then, it is determined whether an absolute value $|V(n)-V_t|$ of a difference between the actual vehicle speed V(n) and the target vehicle speed $V_T$ is greater than a predetermined value $V_0$ (step 156).

If $|V(n)-V_T| > 0$, the difference $\Delta\alpha_A$ between the present vehicle speed change $\alpha(n)$ and the present vehicle speed change $\alpha(n-1)$ is calculated (step 157). Then, it is determined whether an absolute value $|\Delta\alpha_A|$ of the difference is greater than the acceleration change rate $|\Delta\alpha_S|$ (step 158). If $|\Delta\alpha_A| > |\Delta\alpha_S|$, the predetermined time $-T_1$ as the control time $T_V$ is output to the driving circuit 14b (step 159), while if $|\Delta\alpha_A| \leq |\Delta\alpha_S|$, the predetermined time $T_1$ as the control time $T_V$ is output to the driving circuit 14a (step 160). After executing the step 159 or 160, the program is returned to the step 155 after the unit control cycle has elapsed, and the vehicle speed sampling subroutine is executed. On the other hand, if $|V(n) - V_T| \leq V_0$ in step 156, it is determined that the vehicle speed has reached the target vehicle speed $V_T$, and the injection flag $F_{FI}$ is set (step 61), and the resume operation is ended.

Although the above description is applied to the case where the resume operation is started under the condition where the actual vehicle speed is lower than the target vehicle speed $V_T$, the above operation is similarly carried out in the case where the resume operation is started under the condition where the actual vehicle speed is higher than the target vehicle speed $V_T$ except that the predetermined time $T_{D1}$ as the control time $T_V$ is output to the driving circuit 14b so as to start deceleration in the step 153, and the steps 159 and 160 are reversed.

The control quantity calculating subroutine for control circuit C' is also shown with reference to FIG. 8. This subroutine is similar to that for control circuit C and will not now be redescribed.

As described above, the actual vehicle speed is changed to reach the target vehicle speed $V_T$ changed in the deceleration operation, the acceleration operation and the resume operation. Therefore, the magnitude of the acceleration (deceleration) change rate is controlled so as to become equal to the acceleration change rate $|\Delta\alpha_S|$ specified by the acceleration change rate specifying circuit 30.

Furthermore, except in the deceleration operation, the acceleration and the resume operation, the injection flag $F_{FI}$ is set during auto cruise operation. When the injection flag $F_{FI}$ is set, a fuel decreasing signal is supplied from the control circuit to a fuel injection control circuit 15. The fuel injection control circuit 15 operates to increase or decrease a basic injection quantity to be decided from the engine speed and the suction pressure according to the various engine parameters and to provide a final fuel injection quantity as a pulse width. Then, the fuel injection control circuit 15 drives an injector 16 by the pulse width to supply fuel to the engine E.

In the period when the fuel decreasing signal is supplied from the control circuit C', the basic injection quantity is further decreased independently of the various engine parameters to decide the final fuel injection quantity. Accordingly, it is possible to eliminate a rapid change in vehicle speed in the auto cruise speed operation except during deceleration operation, the acceleration operation and the resume operation. Therefore, fuel consumption can be improved without affecting the drivability.

As described above, according to the constant vehicle speed control method of the present invention, the acceleration change rate is decided from the deviation between the target vehicle speed and the actual vehicle speed so as to have the vehicle speed reach the target vehicle speed in a unit control cycle. Then, a next vehicle speed change to be generated in the unit control cycle when the set acceleration change rate is applied to the vehicle is calculated and predicted. Then, the difference between the next vehicle speed change calculated and a present vehicle speed change actually measured in the unit control cycle is set at the vehicle speed change change rate. In consideration of the vehicle speed change change rate set above, a final acceleration change is set to a predetermined small value. Therefore, the engine is controlled in the unit control cycle according to the final acceleration change rate so as to have the vehicle speed reach the target vehicle speed. Accordingly, acceleration or deceleration shock during auto cruise operation is eliminated to ensure a smooth change in vehicle speed. Thus, a pleasant auto cruise operation can be achieved at all times without applying an unpleasant feeling to a driver and/or passenger.

Furthermore, the final acceleration change rate is corrected in consideration of various error conditions including slope, disturbances such as wind, load weight, variation in engine output and non-linearity of engine torque characteristics. Therefore, a satisfactory auto cruise condition may be obtained under various operation conditions.

Additionally, as described above, according to the constant vehicle speed control device of the present invention, the deviation between the actual acceleration change rate and the specified acceleration change rate is detected according to the command signal for commanding a change of the target vehicle speed for every unit control cycle, and the engine output is so controlled as to reduce the deviation. Accordingly, when the acceleration change rate is specified by an operator to change the target vehicle speed during the auto cruise operation, the target vehicle speed is smoothly shifted to a new speed at a pleasant acceleration or deceleration. Furthermore, when the auto cruise operation is resumed by operating the resume switch, the previously set vehicle speed (just before cancellation of the auto cruise operation) can be smoothly obtained.

The invention being thus described, it will be obvious that the same may be varied in many ways. Such variations are not to be regarded as a departure from the spirit and scope of the invention, and also such modification as would be obvious to one skilled in the art are intended to be included within the scope of the following claims.

What is claimed:

1. A method for operating a vehicle at a constant speed comprising the steps of:
   detecting an actual vehicle speed of the vehicle to be driven by an engine for successive predetermined time periods;
   detecting deviation between the vehicle speed and a target vehicle speed for each of said predetermined time periods;
   calculating and predicting a next vehicle speed change to be generated in one of said predetermined time periods from a set acceleration change rate;
   detecting a present vehicle speed change;
   detecting a difference between said next vehicle speed change and said present vehicle speed change as a vehicle speed change alteration rate;
   setting a final acceleration change rate to a predetermined value in consideration of a magnitude of said vehicle speed change alteration rate; and
   controlling the engine during said one predetermined time period to generate said final acceleration change rate.

2. The method for operating a vehicle as recited in claim 1 wherein the step of setting further comprises subtracting a previous vehicle speed change before said one predetermined time period and a previous final acceleration change rate before said one predetermined time period from said present vehicle speed change to calculate an acceleration change deviation, and further comprising calculating and predicting a vehicle weight change ratio and an acceleration change rate due to a change in external force to nullify said acceleration change deviation, and further comprising correcting said final acceleration change rate set according to said vehicle weight change ratio and said acceleration change rate due to the change in external force.

3. The method for operating a vehicle as recited in claim 1 further comprising deciding the set acceleration change rate so as to reduce the vehicle speed deviation.

4. The method for operating a vehicle as recited in claim 1, further comprising the steps of comparing the magnitude of the vehicle speed change alteration rate with a limit value and setting a smaller one of the vehicle speed change alteration rate and the limit value to said final acceleration change rate.

5. The method for operating a vehicle as recited in claim 4 wherein the step of setting further comprises subtracting a previous vehicle speed change before said one predetermined time period and a previous final acceleration change rate before said one predetermined time period from said present vehicle speed change to calculate an acceleration change deviation, and further comprising calculating and predicting a vehicle weight change ratio and an acceleration change rate due to a change in external force to nullify said acceleration change deviation, and further comprising correcting said final acceleration change rate set according to said vehicle weight change ratio and said acceleration change rate due to the change in external force.

6. The method for operating a vehicle as recited in claim 1, wherein the step of setting further comprises correcting the final acceleration change rate according to vehicle operational conditions including disturbances due to external forces.

7. The method for operating a vehicle as recited in claim 6 wherein the step of setting further comprises subtracting a previous vehicle speed change before said one predetermined time period and a previous final acceleration change rate before said one predetermined time period from said present vehicle speed change to calculate an acceleration change deviation, and further comprising calculating and predicting a vehicle weight change ratio and an acceleration change rate due to a change in external force to nullify said acceleration change deviation, and further comprising correcting said final acceleration change rate set according to said vehicle weight change ratio and said acceleration change rate due to the change in external force.

8. A method for operating a vehicle at a constant speed comprising the steps of:
   detecting an actual vehicle speed of a vehicle to be driven by an engine for successive predetermined time periods;
   detecting deviation between the vehicle speed and a target vehicle speed for each of said predetermined time periods;
   comparing a magnitude of said vehicle speed deviation with a limit value and setting a smaller one of said vehicle speed deviation and said limit value to an acceleration change rate;
   calculating and predicting a next vehicle speed change to be generated in one of said predetermined time periods from said set acceleration change rate;
   detecting a present vehicle speed change;
   determining a difference between said next vehicle speed change and said present vehicle speed change as a vehicle speed change alteration rate;
   comparing a magnitude of said vehicle speed change alteration rate with said limit value and setting a smaller one of said vehicle speed change alteration rate and said limit value to a final acceleration change rate; and
   controlling the engine during said one predetermined time period to generate said final acceleration change rate.

9. A constant vehicle speed control device for controlling output of an engine to have an actual vehicle speed for a vehicle to correspond to a target vehicle speed, said constant vehicle speed control device comprising:
   commanding means for generating a command signal for changing the target vehicle speed;
   change rate specifying means for specifying an acceleration change rate;
   detecting means for detecting an actual acceleration change rate from a vehicle speed change for successive predetermined time periods; and
   control means for detecting deviations between the actual acceleration change rate and the acceleration change rate specified by said change rate specifying means in response to said command signal for each of said predetermined time periods and for controlling the output of said engine to reduce said deviation.

* * * * *